United States Patent
Kado

(10) Patent No.: US 9,648,292 B2
(45) Date of Patent: May 9, 2017

(54) IMAGE PROJECTION APPARATUS

(71) Applicant: Takahiro Kado, Kanagawa (JP)

(72) Inventor: Takahiro Kado, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/818,388

(22) Filed: Aug. 5, 2015

(65) Prior Publication Data

US 2016/0057398 A1     Feb. 25, 2016

(30) Foreign Application Priority Data

Aug. 22, 2014   (JP) ................................. 2014-169283

(51) Int. Cl.
G03B 21/20 (2006.01)
H04N 9/31 (2006.01)
G03B 33/08 (2006.01)
H04N 5/74 (2006.01)

(52) U.S. Cl.
CPC ......... *H04N 9/3182* (2013.01); *G03B 21/202* (2013.01); *G03B 21/206* (2013.01); *G03B 21/2053* (2013.01); *H04N 9/3114* (2013.01); *H04N 9/3155* (2013.01); *G03B 33/08* (2013.01); *H04N 5/7458* (2013.01)

(58) Field of Classification Search
CPC .............. G03B 21/202; G03B 21/2026; G03B 21/2053; H04N 9/3114; H04N 9/3155; H04N 9/3182
USPC ..................................................... 353/84, 85
See application file for complete search history.

(56) References Cited

U.S. PATENT DOCUMENTS

| 2004/0008288 | A1 | 1/2004 | Pate et al. |
| 2010/0148682 | A1 | 6/2010 | Yamauchi et al. |
| 2011/0019164 | A1* | 1/2011 | Wu ..................... G03B 21/2053 353/84 |

FOREIGN PATENT DOCUMENTS

| EP | 2065877 A1 | 6/2009 |
| JP | 2003-295318 | 10/2003 |
| JP | 2009-085977 | 4/2009 |
| JP | 5213080 | 3/2013 |
| JP | 2014-041359 | 3/2014 |
| JP | 2014-048502 | 3/2014 |

(Continued)

OTHER PUBLICATIONS

Extended European Search Report dated Jan. 11, 2016.

*Primary Examiner* — William C Dowling
*Assistant Examiner* — Ryan Howard
(74) *Attorney, Agent, or Firm* — Harness, Dickey & Pierce, P.L.C.

(57) ABSTRACT

An image projection apparatus includes a light source, a color wheel, a controller. The controller controls, in a first mode, electric power supplied to the light source at a timing of a first color filter being irradiated with light from the light source to be a value higher than electric power supplied to the light source at a timing of a second color filter corresponding to a color having lower visibility than a color of the first color filter being irradiated with the light from the light source. Furthermore, the controller controls, in a second mode, the electric power supplied to the light source at the timing of the first color filter being irradiated with the light from the light source to be a value lower than the electric power supplied to the light source at the timing of the second color filter being irradiated with the light.

14 Claims, 6 Drawing Sheets

(56) References Cited

FOREIGN PATENT DOCUMENTS

WO      WO-9511572 A1    4/1995
WO      WO2010/109602 A1    9/2010

* cited by examiner

IMAGE PROJECTION APPARATUS

CROSS-REFERENCE TO RELATED APPLICATIONS

The present application claims priority to and incorporates by reference the entire contents of Japanese Patent Application No. 2014-169283 filed in Japan on Aug. 22, 2014.

BACKGROUND OF THE INVENTION

1. Field of the Invention

The present invention relates to an image projection apparatus.

2. Description of the Related Art

Conventionally, projectors of a digital light processing (DLP) (registered trademark) system widely employ a method of varying a waveform of electric power that is supplied to a light source emitting light having brightness in accordance with the electric power that is supplied depending on video image modes in order to change the brightness and color among the video image modes. For example, in a video image mode called high-brightness mode requiring high brightness, a method in which electric power that is supplied to the light source increases at a timing at which a transparent segment (transparent color filter) of a color wheel as a transmissive disc segmented into a plurality of colors is irradiated with light from the light source and the electric power that is supplied to the light source decreases at a timing at which a blue segment thereof is irradiated with the light from the light source can be used.

For example, Japanese Patent Application Laid-open No. 2014-41359 discloses a method in which brightness of a light source for each of filters in a projector using a color wheel having red, blue, green, and transparent filters is changed so as to increase brightness of white light of the projector or increase intensities of red light and blue light instead of decreasing the brightness of the white light.

However, There is no conventional projector capable of switching a mode in which brightness of a projected image is maximum and a mode in which the brightness of the projected image is minimum, and even a structure for providing such projector has not been known.

SUMMARY OF THE INVENTION

It is an object of the present invention to at least partially solve the problems in the conventional technology.

According to the present invention, there is provided an image projection apparatus comprising: a light source that emits light having brightness in accordance with electric power that is supplied; a color wheel that includes a plurality of color filters disposed along a circumferential direction and transmits the light from the light source sequentially from each of the color filters; a controller that controls the electric power that is supplied to the light source variably in accordance with a timing at which each of the color filters is irradiated with the light from the light source; and an image forming unit that modulates intensity of the light that has transmitted through the color wheel so as to form an image, wherein in a first mode, the controller controls electric power that is supplied to the light source at a timing at which a first color filter is irradiated with the light from the light source to be a value higher than electric power that is supplied to the light source at a timing at which a second color filter corresponding to a color having lower visibility than a color of the first color filter is irradiated with the light from the light source, and in a second mode, the controller controls the electric power that is supplied to the light source at the timing at which the first color filter is irradiated with the light from the light source to be a value lower than the electric power that is supplied to the light source at the timing at which the second color filter is irradiated with the light from the light source.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of an image projection apparatus according to the present invention will be described in detail with reference to the accompanying drawings.

Figure 1:
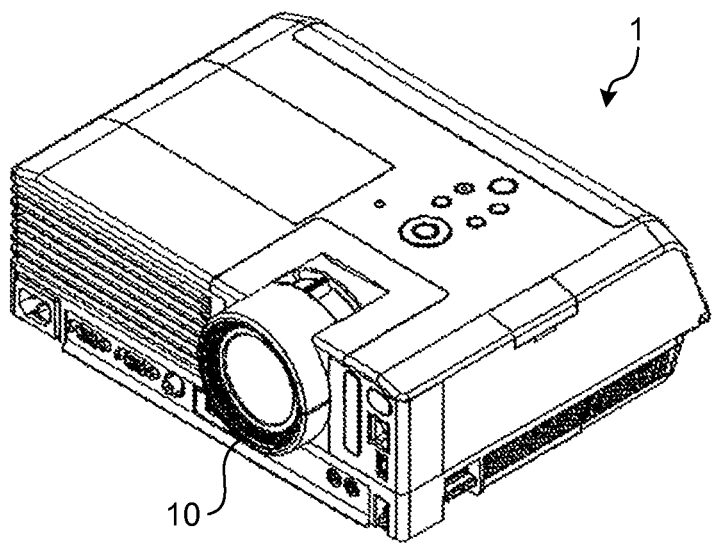
FIG. 1 is a perspective view of a projector according to an embodiment of the present invention.
Figure 2:
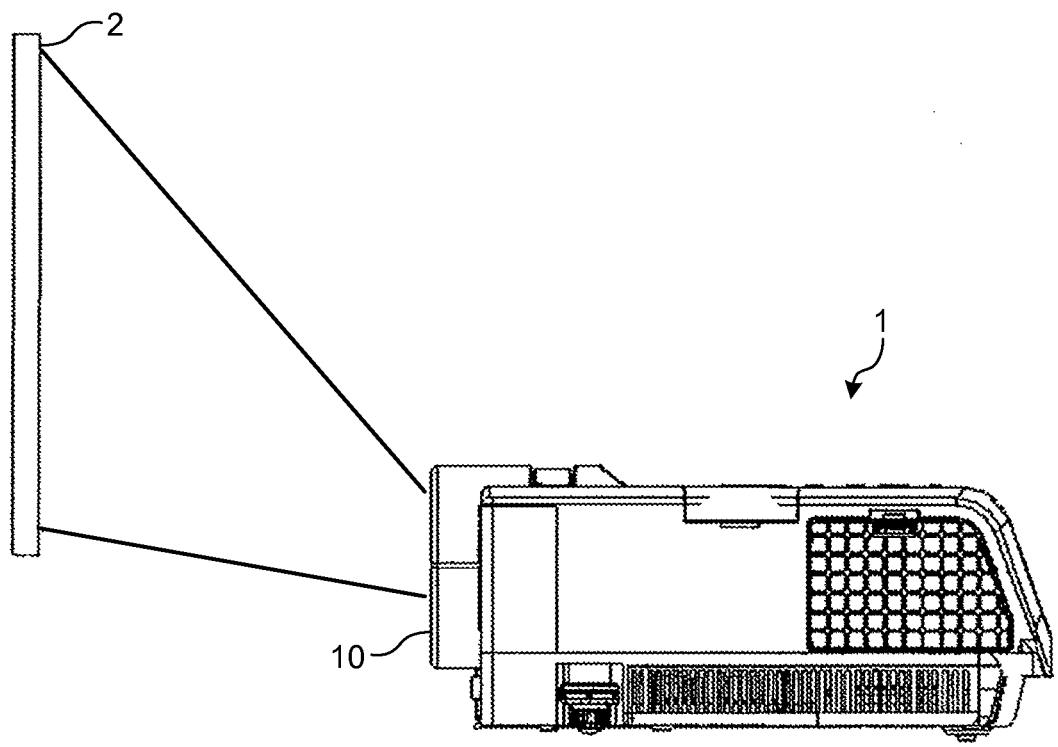
FIG. 2 is a side view of the projector in the embodiment.

FIG. 1 is a perspective view of a projector 1 as the image projection apparatus to which the present invention is applied, and FIG. 2 is a side view of the projector 1. FIG. 2 illustrates a state where a screen 2 as an example of a projection target matter is irradiated with projection light emitted from a projection lens 10 of the projector 1.

Figure 3:
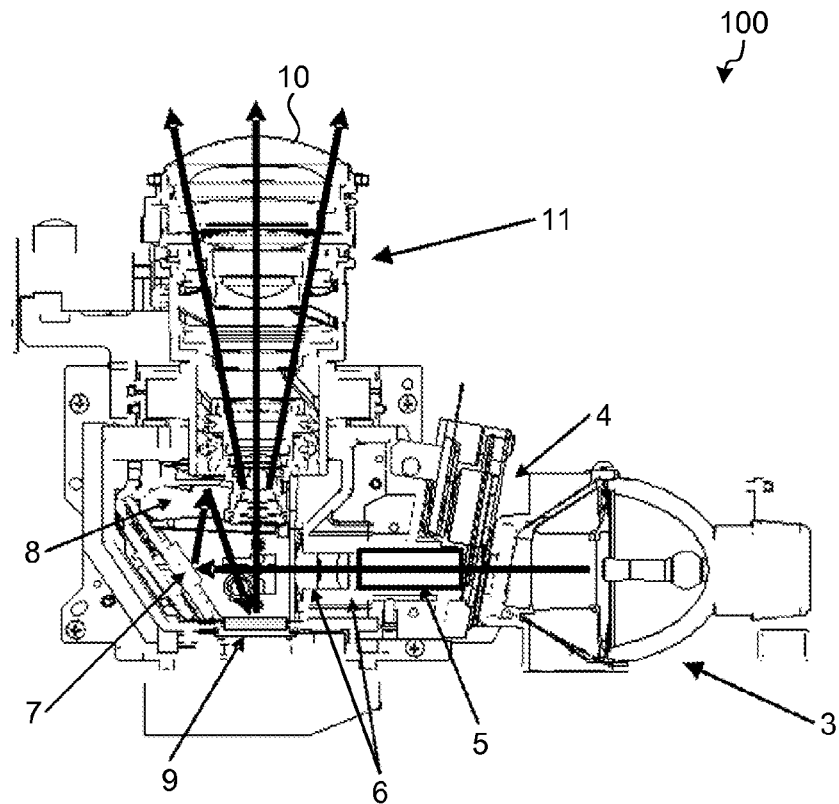
FIG. 3 is a diagram illustrating an example of the configuration of an optical engine unit in the embodiment.

FIG. 3 is a diagram illustrating an example of the configuration of an optical engine unit 100 in the projector 1. As illustrated in FIG. 3, light emitted from a light source unit (lamp unit) 3 transmits through a color wheel 4, passes through a light tunnel 5, and is incident on an image forming unit 9 through a plurality of mirrors including relay lenses 6, a planar mirror 7, and a concave mirror 8.

In the present embodiment, the image forming unit 9 is configured by a digital mirror device (DMD) having a rectangular mirror surface formed by a plurality of micro mirrors. The DMD processes and reflects projection light so as to form a certain image by the driving of the respective micro mirrors thereof in a time division manner based on data (referred to as "input signal" in some cases in the following description) of a video image or an image that is input. It should be noted that the image forming unit 9 is not limited to be configured by the DMD. In summary, it is sufficient that the image forming unit 9 has a function of modulating intensity of light (light emitted from the light source unit 3 in a broad sense) that has transmitted through the color wheel 4 and forming an image. The DMD selects light that is supplied to a projection unit 11 by switching ON/OFF of the respective micro mirrors in accordance with the input signal. The light supplied to the projection unit 11 passes through a plurality of projection lenses 10 to be enlarged and the enlarged video image light is projected onto the screen 2.

Figure 4:
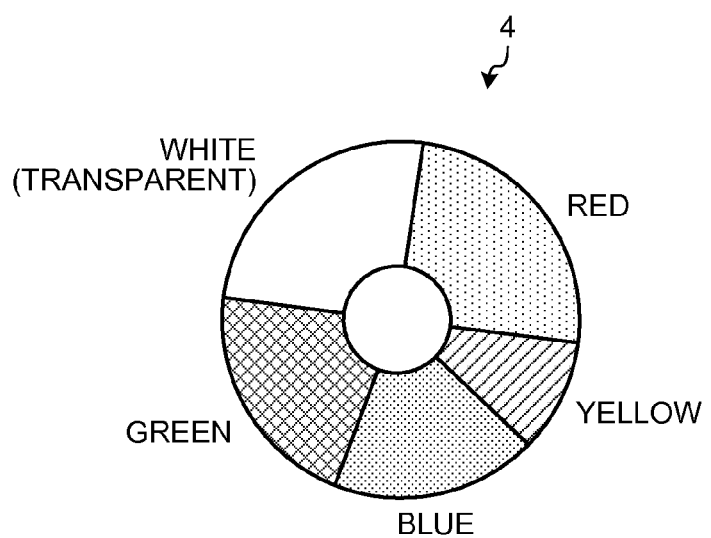
FIG. 4 is a diagram illustrating an example of a color wheel.

FIG. 4 is a diagram illustrating an example of the color wheel 4. As illustrated in FIG. 4, the color wheel 4 is a transmissive disc having the color filters disposed along the circumferential direction. The color wheel 4 transmits the light from the light source unit 3 sequentially from the color filters thereof. In the example of FIG. 4, the color wheel 4 includes a red color filter that converts white light from the light source unit 3 to red light, a yellow color filter that converts the white light to yellow light, a blue color filter that converts the white light to blue light, a green color filter that converts the white light to green light, and a transparent (white) color filter that transmits the white light as it is. Each color filter has a fan-like shape and a central angle thereof is set to a certain value. A setting manner of the central angle will be described later.

Although the configuration as illustrated in FIG. 4 is employed as types and angles (central angles) of the color filters of the color wheel 4 in the present embodiment, they are not limited thereto. Alternatively, the configuration in which color filters of cyan and magenta are added to them or the configuration in which the color wheel 4 is formed by three colors of color filters including red, blue, and green may be employed.

Figure 5:
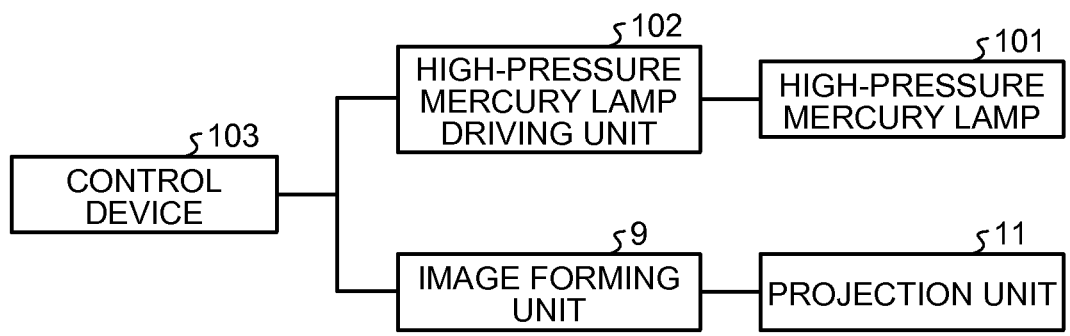
FIG. 5 is a diagram illustrating an example of the hardware configuration of the projector.

FIG. 5 is a diagram illustrating an example of the hardware configuration of the projector 1 in the present embodiment. For the convenience of description, FIG. 5 illustrates the minimum necessary configuration for carrying out the present invention. As illustrated in FIG. 5, the projector 1 includes a high-pressure mercury lamp 101, a high-pressure mercury lamp driving unit 102, the image forming unit 9, the projection unit 11, and a control device 103.

Figure 6:
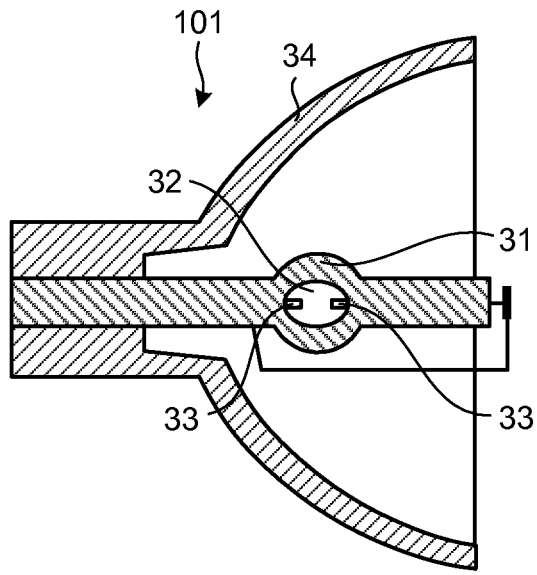
FIG. 6 is a diagram illustrating an example of a section of a high-pressure mercury lamp.

The high-pressure mercury lamp 101 emits light having the brightness in accordance with electric power that is supplied. To be more specific, as illustrated in FIG. 6, the high-pressure mercury lamp 101 includes a tube portion 31, mercury 32 sealed into the tube portion 31 with high pressure, a pair of electrodes 33 provided in the tube portion 31, and a reflector 34. The high-pressure mercury lamp 101 functions as a light source with the mercury 32 emitting light by electric discharge between the pair of electrodes 33.

Description is continued with reference back to FIG. 5. The high-pressure mercury lamp driving unit 102 variably controls electric power that is supplied to the high-pressure mercury lamp 101 under control by the control device 103. The high-pressure mercury lamp driving unit 102 can cause the electric power that is supplied to the high-pressure mercury lamp 101 to vary in a short period of time. This mechanism enables the electric power that is supplied to the high-pressure mercury lamp 101, that is, brightness of the light (white light) that is emitted from the high-pressure mercury lamp 101 to vary in accordance with a timing at which each of the color filters of the color wheel 4 is irradiated with the light from the light source unit 3 (the light can be regarded as light from the high-pressure mercury lamp 101 as the light source) so as to adjust the brightness and color balance of projection light.

In this example, the light source unit 3 as illustrated in FIG. 3 is configured by the high-pressure mercury lamp 101 and the high-pressure mercury lamp driving unit 102. In this example, it can be considered that the high-pressure mercury lamp 101 corresponds to a "light source" in the scope of the present invention or the light source unit 3 corresponds to the "light source" in the scope of the invention. In the following description, the high-pressure mercury lamp 101 or the light source unit 3 is referred to as a "light source" in some cases.

The image forming unit 9 modulates the intensity of light that has transmitted through the color wheel 4 so as to form an image. As described above, in the present embodiment, the image forming unit 9 is configured by the digital mirror device. The projection unit 11 enlarges and projects the image formed by the image forming unit 9 onto the screen 2. The image formed by the image forming unit 9 can be considered to be an image (image as a projection target) that is projected onto the screen 2 (an example of the projection target matter) and is referred to as a "projected image" in some cases in the following description. The control device 103 determines operations of the high-pressure mercury lamp driving unit 102 and the image forming unit 9.

The control device 103 controls the operations of the entire projector 1 totally. The projector 1 in the present embodiment has two modes. One of the two modes is a first mode in which the brightness of the projected image is maximum and another of the two modes is a second mode in which the brightness of the projected image is minimum. The control device 103 controls, in the first mode, electric power that is supplied to the light source at a timing at which a first color filter is irradiated with the light from the light source to be a value higher than electric power that is supplied to the light source at a timing at which a second color filter corresponding to a color having lower visibility than a color of the first color filter is irradiated with the light from the light source. On the other hand, the control device 103 controls, in the second mode, the electric power that is supplied to the light source at the timing at which the first color filter is irradiated with the light from the light source to be a value lower than the electric power that is supplied to the light source at the timing at which the second color filter is irradiated with the light from the light source.

Although the above-mentioned second color filter corresponds to the red color filter and the blue color filter whereas the above-mentioned first color filter corresponds to the yellow color filter, the green color filter, and the transparent (white) color filter in the present embodiment, they are not limited thereto.

Figure 7:
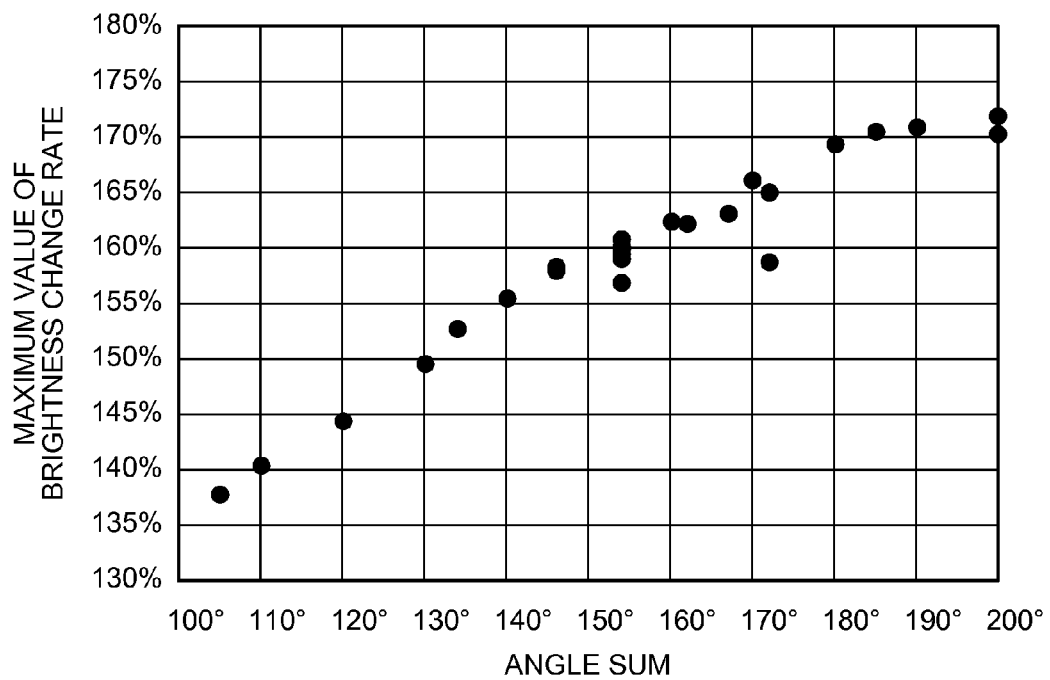
FIG. 7 is a graph illustrating a relation between an angle sum and a maximum value of a brightness change rate.

FIG. 7 is a graph illustrating a relation between an angle sum of the central angles of the red color filter and the blue color filter (an angle sum of the central angles of the second color filters) and a maximum value of a brightness change rate. The maximum value of the brightness change rate indicates a rate of brightness of light (average illuminance of the light that has transmitted through the color wheel 4 in a constant period of time) when a waveform indicating variation of the electric power that is supplied to the light source over time is set so as to provide maximum brightness of the projected image relative to brightness of light when the above-mentioned waveform is set so as to provide minimum brightness of the projected image. In the present embodiment, the magnitude of the electric power that is supplied to the light source is set variably for each timing at which each of the color filters is irradiated with the light from the light source. The height of the above-mentioned waveform is not therefore a constant height. In the following description, the above-mentioned waveform (waveform indicating the variation of the electric power that is supplied to the light source over time) in the present embodiment is referred to as a "ramp waveform" in some cases.

The horizontal axis of the graph in FIG. 7 indicates the angle sum of the central angles of the red color filter and the blue color filter (hereinafter, simply referred to as "angle sum" in some cases) and the vertical axis indicates the maximum value of the brightness change rate. As is seen from FIG. 7, the maximum value of the brightness change rate increases as the angle sum increases. For example, the maximum value of the brightness change rate can increase to be equal to or larger than 170% by setting the angle sum to be equal to or larger than 180°.

Figure 8:
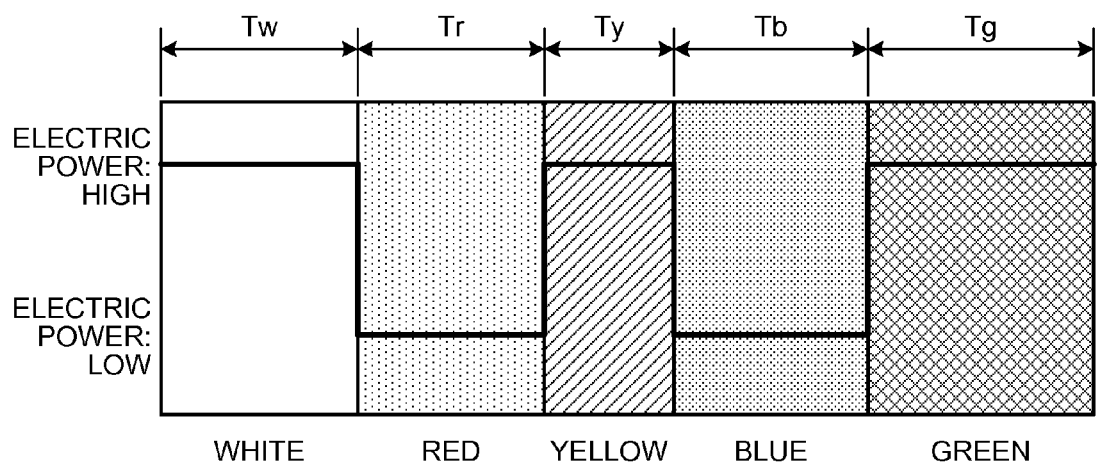
FIG. 8 is a diagram illustrating an example of a ramp waveform in a first mode.

FIG. 8 is a diagram illustrating an example of a ramp waveform set so as to provide maximum brightness of the projected image, that is, the ramp waveform in the first mode. As is seen from FIG. 8, the control device 103 controls electric power that is supplied to the light source at timings (Tw, Ty, and Tg) at which each of the transparent (white) color filter, the yellow color filter, and the green color filter is irradiated with the light from the light source to be a value higher than electric power that is supplied to the light source at timings (Tr and Tb) at which each of the red color filter and the blue color filter corresponding to colors having lower visibility than the colors (white, yellow, green) is irradiated with the light from the light source in the first mode.

Figure 9:
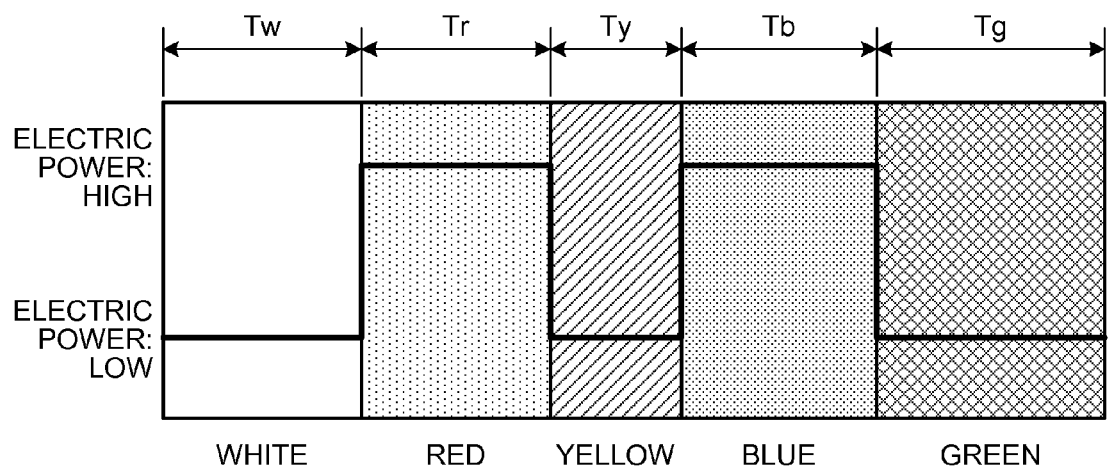
FIG. 9 is a diagram illustrating an example of a ramp waveform in a second mode.

FIG. 9 is a diagram illustrating an example of a ramp waveform set so as to provide minimum brightness of the projected image, that is, the ramp waveform in the second mode. As is seen from FIG. 9, the control device 103 controls, in the second mode, the electric power that is supplied to the light source at the timings (Tw, Ty, and Tg) at which each of the transparent (white) color filter, the yellow color filter, and the green color filter is irradiated with the light from the light source to be a value lower than the electric power that is supplied to the light source at the timings (Tr and Tb) at which each of the red color filter and the blue color filter is irradiated with the light from the light source.

Electric energy (time integration value of electric power) that is supplied to the light source is constant and the shape of the ramp waveform is set variably within a range of the constant electric energy. In the present embodiment, the central angles of the second color filters are previously set such that the maximum electric power can be supplied to the light source at the timing at which the second color filters are irradiated with the light from the light source in the second mode. That is to say, as illustrated in FIG. 9, the central angle of each of the red color filter and the blue color filter is set such that the maximum electric power can be supplied to the light source at each of the timing Tr at which the red color filter is irradiated with the light from the light source and the timing Tb at which the blue color filter is irradiated with the light from the light source. Although the angle sum of the central angles of the red color filter and the blue color filter is set to be equal to or larger than 180° as an example, the angle sum is not limited thereto. For example, the angle sum may be set to be 150° or set to be 160°, for example.

As described above, in the present embodiment, the electric power that is supplied to the light source at the timings at which each of the transparent (white) color filter, the yellow color filter, and the green color filter is irradiated with the light from the light source is controlled, in the first mode, to be a value higher than the electric power that is supplied to the light source at timings at which each of the red color filter and the blue color filter corresponding to the colors having lower visibility than the colors (white, yellow, green) is irradiated with the light from the light source. On the other hand, in the second mode, the electric power that is supplied to the light source at the timings at which each of the transparent (white) color filter, the yellow color filter, and the green color filter is irradiated with the light from the light source is controlled to be a value lower than the electric power that is supplied to the light source at the timings at which each of the red color filter and the blue color filter is irradiated with the light from the light source. The control can provide the projector capable of switching the first mode in which the brightness of the projected image is maximum and the second mode in which the brightness of the projected image is minimum.

In the present embodiment, the control device 103 has the hardware configuration same as that of a common computer device including a central processing unit (CPU), a read only memory (ROM), and a random access memory (RAM), and the above-mentioned functions of the control device 103 operate by the CPU executing computer programs stored in the ROM or the like. Computer programs that are executed by the control device 103 in the present embodiment may be recorded and provided in a computer-readable recording medium such as a compact disc read only memory (CD-ROM), a flexible disk (FD), a compact disc recordable (CD-R), a digital versatile disc (DVD), and a universal serial bus (USB) as an installable or executable file or may be provided or distributed via a network such as the Internet. Furthermore, various types of the computer programs may be embedded and provided in a non-volatile recording medium such as the ROM.

Although one embodiment of the present invention has been described hereinbefore, the above-mentioned embodiment has been proposed as an example and does not intend to limit the scope of the invention. The invention is not limited to the above-mentioned embodiment as it is and can be embodied while changing constituent components in a range without departing from the scope thereof at an execution stage. Furthermore, various inventions can be made by appropriately combining the constituent components as disclosed in the above-mentioned embodiment. For example, some constituent components may be deleted from all the constituent components as described in the present embodiment.

For example, the color wheel 4 may further include a color filter of magenta (red-violet) in addition to the color filters of the colors as described in the above-mentioned embodiment. In this case, the above-mentioned second color filters correspond to the red color filter, the blue color filter, and the magenta color filter.

Figure 10:
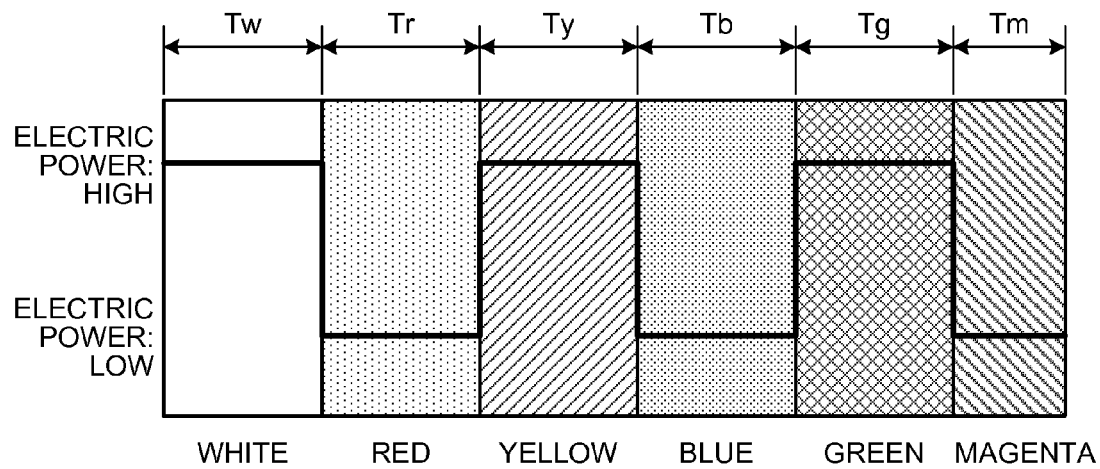
FIG. 10 is a diagram illustrating an example of a ramp waveform in a first mode according to a variation.

FIG. 10 is a diagram illustrating an example of a ramp waveform in a first mode according to a variation. As is seen from FIG. 10, the control device 103 controls electric power that is supplied to the light source at timings (Tw, Ty, and Tg) at which each of the transparent (white) color filter, the yellow color filter, and the green color filter is irradiated with the light from the light source to be a value higher than electric power that is supplied to the light source at timings (Tr, Tb, and Tm) at which each of the red color filter, the blue color filter, and the magenta color filter corresponding to colors having lower visibility than the colors (white, yellow, green) is irradiated with the light from the light source in the first mode.

Figure 11:
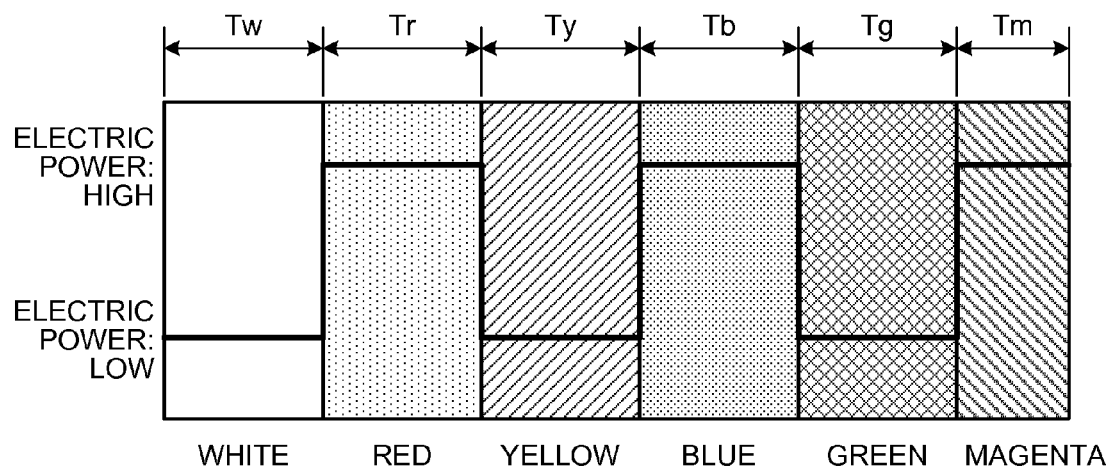
FIG. 11 is a diagram illustrating an example of a ramp waveform in a second mode in the variation.

FIG. 11 is a diagram illustrating an example of a ramp waveform in a second mode in the variation. As is seen from FIG. 11, the control device 103 controls the electric power that is supplied to the light source at the timings (Tw, Ty, and Tg) at which each of the transparent (white) color filter, the yellow color filter, and the green color filter is irradiated with the light from the light source to be a value lower than the electric power that is supplied to the light source at the timings (Tr, Tb, and Tm) at which each of the red color filter, the blue color filter, and the magenta color filter is irradiated with the light from the light source in the second mode.

In the variation, as illustrated in FIG. 11, the central angle of each of the red color filter, the blue color filter, and the magenta color filter is set such that the maximum electric power can be supplied to the light source at each of the timing Tr at which the red color filter is irradiated with the light from the light source, the timing Tb at which the blue color filter is irradiated with the light from the light source, and the timing Tm at which the magenta color filter is irradiated with the light from the light source. For example, the angle sum of the central angles of the red color filter, the blue color filter, and the magenta color filter may be set to be equal to or larger than 180° but is not limited thereto.

Figure 12:
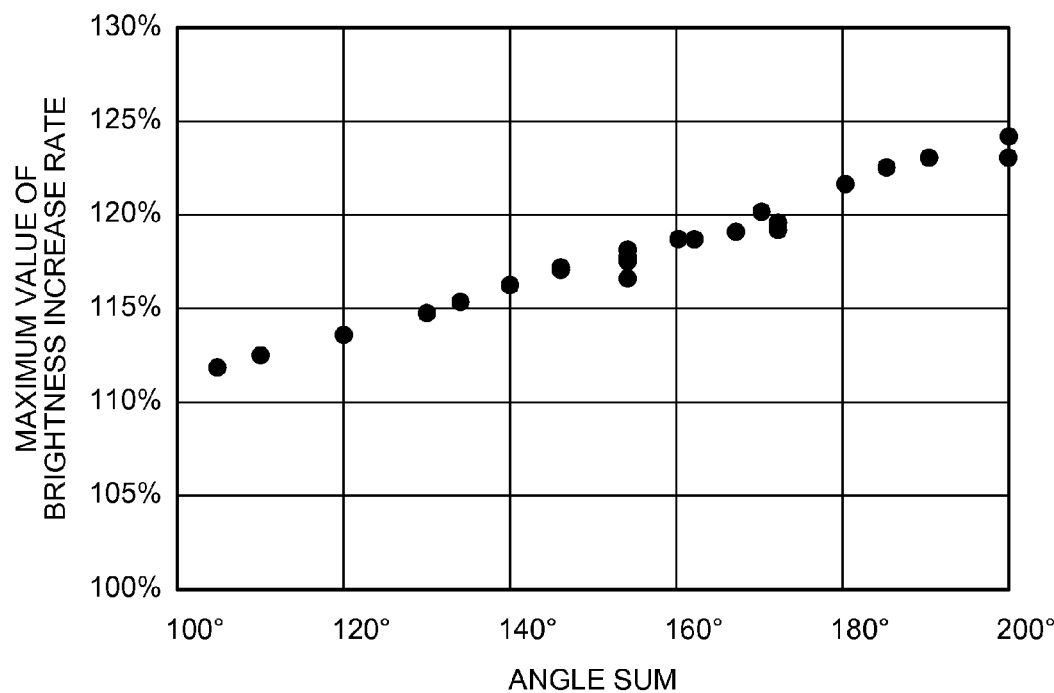
FIG. 12 is a graph illustrating a relation between the angle sum and a maximum value of a brightness increase rate.

FIG. 12 is a graph illustrating a relation between the angle sum of the central angles of the red color filter and the blue color filter and a maximum value of a brightness increase rate. The maximum value of the brightness increase rate indicates a rate of the brightness of light when the ramp waveform is set so as to provide the maximum brightness of the projected image relative to brightness of light when the electric power that is supplied to the light source is set to be constant (when the ramp waveform is not used).

The horizontal axis of the graph in FIG. 12 indicates the angle sum of the central angles of the red color filter and the blue color filter and the vertical axis indicates the maximum value of the brightness increase rate. As is seen from FIG. 12, the maximum value of the brightness increase rate increases as the angle sum increases. For example, the maximum value of the brightness increase rate can increase to be equal to or higher than 120% by setting the angle sum to be equal to or larger than 180°. That is to say, in the first mode in which the brightness of the projected image is maximum, a significant effect that the maximum value of the brightness increase rate can further increase can be provided by setting the ramp waveform so as to provide the maximum brightness of the projected image and setting the angle sum to be equal to or larger than 180°.

The configuration is not limited thereto. For example, in the mode in which the color wheel 4 further includes the color filter of magenta (red-violet) in addition to the color filters of the colors as described in the above-mentioned embodiment, the angle sum of the central angles of the red color filter, the blue color filter, and the magenta color filter can be also set to be equal to or larger than 180°. Alternatively, for example, a configuration without providing the second mode can be also employed. It should be noted that the above-mentioned embodiment and variations can be optionally combined.

The embodiments of the present invention can provide an image projection apparatus capable of switching a mode in which brightness of a projected image is maximum and a mode in which the brightness of the projected image is minimum.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus comprising:
a light source to emit light having brightness in accordance with supplied electric power;
a color wheel, including a plurality of color filters disposed along a circumferential direction, to transmit the light from the light source sequentially from each of the plurality of color filters;
a controller to control the electric power supplied to the light source variably in accordance with a timing at which each of the plurality of color filters is irradiated with the light from the light source; and
an image forming unit to modulate intensity of the light transmitted through the color wheel so as to form an image, wherein
in a first mode, the controller is configured to control electric power supplied to the light source at a timing at which a first color filter of the plurality of color filters is irradiated with the light from the light source to be a value relatively higher than electric power supplied to the light source at a timing at which a second color filter of the plurality of color filters corresponding to a color having a relatively lower visibility than a color of the first color filter is irradiated with the light from the light source, and
in a second mode, the controller is configured to control the electric power supplied to the light source at the timing at which the first color filter is irradiated with the light from the light source to be a value relatively lower than the electric power supplied to the light source at the timing at which the second color filter is irradiated with the light from the light source, wherein
the second color filter includes a red color filter, a blue color filter, and a magenta color filter, and wherein an angle sum of a central angle of the red color filter having a fan-like shape, a central angle of the blue color filter having a fan-like shape, and a central angle of the magenta color filter having a fan-like shape is equal to or larger than 180°.

2. The image projection apparatus according to claim 1, wherein
the first mode is a mode in which brightness of the image is maximum, and
the second mode is a mode in which brightness of the image is minimum.

3. The image projection apparatus according to claim 1, wherein in the second mode, a central angle of the second color filter having a fan-like shape is set such that maximum electric power is capable of being supplied to the light source at the timing at which the second color filter is irradiated with the light from the light source.

4. The image projection apparatus according to claim 1, wherein the image forming unit is a digital mirror device.

5. The image projection apparatus according to claim 4, wherein the digital mirror device includes a plurality of micro mirrors.

6. The image projection apparatus according to claim 1, wherein the light source is a mercury lamp.

7. The image projection apparatus according to claim 1, wherein
the first color filter includes a white color filter, a yellow color filter, and a green color filter.

8. An image projection apparatus comprising:
a light source to emit light having brightness in accordance with supplied electric power;

a color wheel, including a plurality of color filters disposed along a circumferential direction, to transmit the light from the light source sequentially from each of the plurality of color filters;

an image forming unit to modulate intensity of the light transmitted through the color wheel so as to form an image;

a memory storing computer-readable instructions; and one or more processors configured to execute the computer-readable instructions such that the one or more processors are configured to control the electric power supplied to the light source variably in accordance with a timing at which each of the plurality of color filters is irradiated with the light from the light source, wherein in a first mode, the one or more processors are configured to control electric power supplied to the light source at a timing at which a first color filter of the plurality of color filters is irradiated with the light from the light source to be a value relatively higher than electric power supplied to the light source at a timing at which a second color filter of the plurality of color filters corresponding to a color having a relatively lower visibility than a color of the first color filter is irradiated with the light from the light source, and in a second mode, the one or more processors are configured to control the electric power supplied to the light source at the timing at which the first color filter is irradiated with the light from the light source to be a value relatively lower than the electric power supplied to the light source at the timing at which the second color filter is irradiated with the light from the light source, wherein the second color filter is a red color filter, a blue color filter, and a magenta color filter, and wherein an angle sum of a central angle of the red color filter having a fan-like shape, a central angle of the blue color filter having a fan-like shape, and a central angle of the magenta color filter having a fan-like shape is equal to or larger than 180°.

9. The image projection apparatus according to claim 8, wherein the first mode is a mode in which brightness of the image is maximum, and the second mode is a mode in which brightness of the image is minimum.

10. The image projection apparatus according to claim 8, wherein in the second mode, a central angle of the second color filter having a fan-like shape is set such that maximum electric power is capable of being supplied to the light source at the timing at which the second color filter is irradiated with the light from the light source.

11. The image projection apparatus according to claim 8, wherein the image forming unit is a digital mirror device.

12. The image projection apparatus according to claim 11, wherein the digital mirror device includes a plurality of micro mirrors.

13. The image projection apparatus according to claim 8, wherein the light source is a mercury lamp.

14. The image projection apparatus according to claim 8, wherein the first color filter includes a white color filter, a yellow color filter, and a green color filter.

* * * * *